United States Patent [19]

Shinchi et al.

[11] Patent Number: 4,718,387

[45] Date of Patent: Jan. 12, 1988

[54] FUEL INJECTION TIMING CONTROL METHOD FOR INTERNAL COMBUSTION ENGINES

[75] Inventors: Takashi Shinchi; Takafumi Nishikawa, both of Wako, Japan

[73] Assignee: Honda Giken Kogyo Kabushiki Kaisha, Tokyo, Japan

[21] Appl. No.: 9,268

[22] Filed: Jan. 30, 1987

[30] Foreign Application Priority Data

Jan. 31, 1986 [JP] Japan .................................. 61-019876

[51] Int. Cl.$^4$ .............................................. F02D 41/02
[52] U.S. Cl. ....................................... 123/478; 123/490
[58] Field of Search ............... 123/478, 480, 486, 487, 123/490, 492, 493

[56] References Cited

U.S. PATENT DOCUMENTS

| 4,508,085 | 4/1985 | Yamato | 123/492 |
| 4,582,035 | 4/1986 | Kishi | 123/490 X |
| 4,593,665 | 6/1986 | Kishi | 123/490 X |

Primary Examiner—Tony M. Argenbright
Attorney, Agent, or Firm—Lyon & Lyon

[57] ABSTRACT

A method of controlling the timing of fuel injection in an internal combustion engine, wherein the injection timing of each of a plurality of fuel injection valves provided respectively for as many cylinders is determined in response to engine operating conditions. When it is determined that the engine is in a first predetermined operating condition, fuel is injected into a cylinder that corresponds to the present pulse of a control signal upon generation of same. The control signal is generated at a predetermined crank angle before a top dead center of each cylinder at the start of the intake stroke in the cylinder. When the engine is in a second predetermined operating condition, fuel is injected into another cylinder that corresponds to a pulse of the control signal next to the present pulse, upon generation of the present pulse. Preferably, the first and second predetermined operating conditions are determined by the engine rotational speed and/or the engine temperature.

6 Claims, 4 Drawing Figures

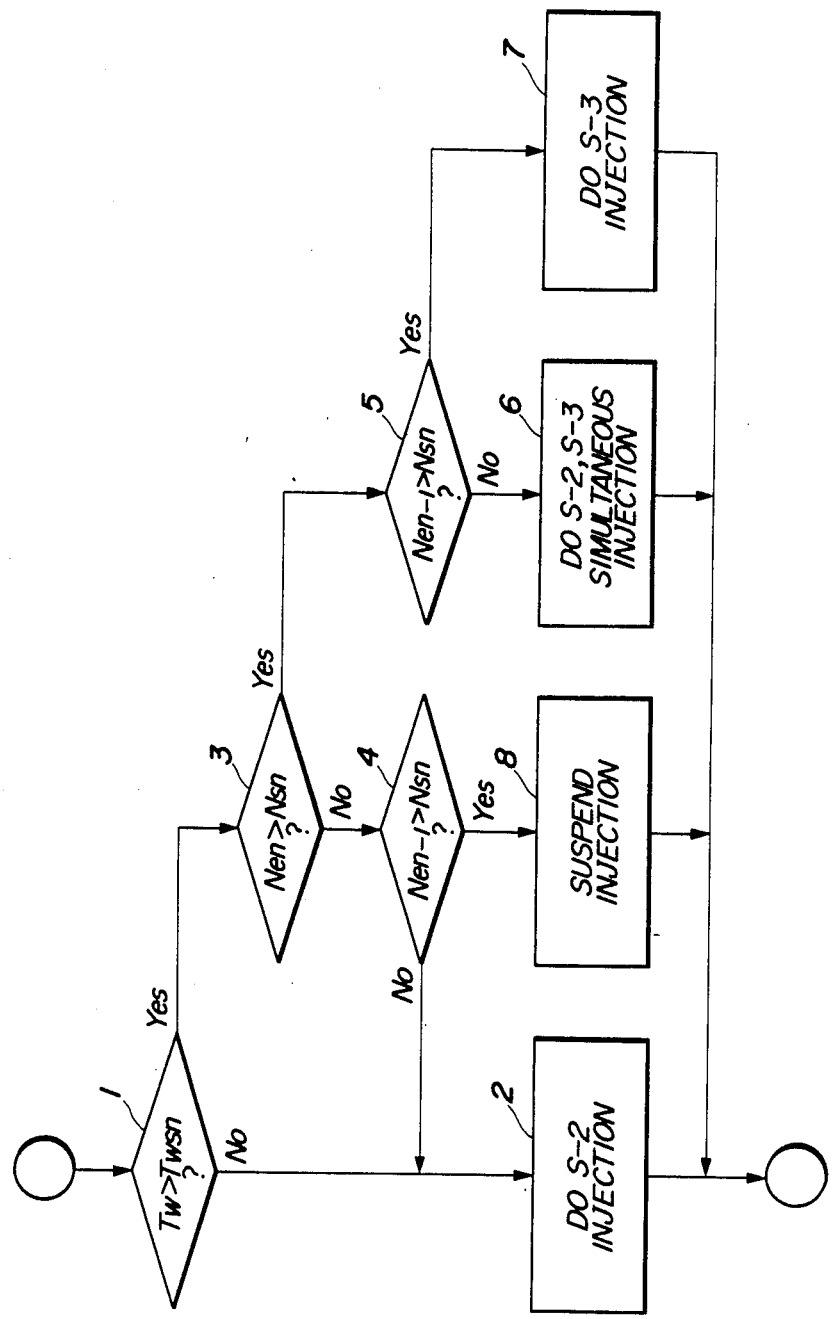

FUEL INJECTION TIMING CONTROL METHOD FOR INTERNAL COMBUSTION ENGINES

BACKGROUND OF THE INVENTION

This invention relates to a fuel injection timing control method for internal combustion engines, and more particularly to a method of this kind wherein the fuel injection timing is determined in response to operating conditions of the engine.

In an internal combustion engine equipped with fuel injection valves, fuel mist injected into the intake pipe is carried by intake air into each cylinder via an intake valve. Therefore, generally, the injection timing of each fuel injection valve is determined such that fuel is supplied into the respective cylinder when the flow rate of the intake air becomes maximum, i.e. when the intake valve is opened, to thereby optimize atomization of fuel. This manner of determining the fuel injection timing is intended to compensate for a decrease in fuel atomization degree which occurs especially when the engine is operating in a low load condition wherein the intake air flow rate is relatively low, or when the engine is in a cold state, whereby the engine driveability is improved.

However, if this manner of determining the fuel injection timing of the fuel injection valves is applied to an engine of such design that the opening action of the intake valves are commenced before the respective exhaust valves are completely closed in order to improve the intake efficiency and thus to increase the engine output, there occurs a problem of increased concentration of HC in the exhaust gases, which is caused by the following phenomenon: for instance, when the engine is operating in a high load condition wherein the intake air flow rate is relatively high, the intake air flow rate rises so high immediately after the intake valve is opened that some of the injected fuel sucked into the cylinder is directly expelled from the cylinder through the exhaust valve without remaining there.

Therefore, it is necessary to set the fuel injection timing of the fuel injection valves to different timings depending on different operating conditions of the engine. Also, if the fuel injection timing is set to different timings in response to various operating conditions of the engine, it is necessary to change the fuel injection timing smoothly upon a transition in engine operating condition.

In order to meet these necessities, one possible way is to employ a timer for changing the fuel injection timing in response to changes in the engine operating condition. However, such way necessitates a complication of the construction of the fuel injection control system, and therefore impractical in terms of cost.

SUMMARY OF THE INVENTION

It is an object of the invention to provide a fuel injection timing control method for internal combustion engines, which is capable of controlling the fuel injection timing to suitable values appropriate to different operating conditions of the engine and also capable of changing the fuel injection timing in response to changes in the engine operating condition in a simple manner.

It is another object of the invention to smoothly change in the fuel injection timing in response to changes in the engine operating condition.

The present invention provides a method of controlling the timing of fuel injection in an internal combustion engine having a plurality of cylinders and as many fuel injection valves provided respectively for the cylinders, wherein the injection timing of each of the fuel injection valves is determined in response to operating conditions of the engine. The method comprises the steps of: (1) determining operating conditions of the engine; (2) supplying fuel through injection to one of the cylinders that corresponds to a present pulse of a control signal upon generation of the present pulse, when the engine is determined to be in a first predetermined operating condition, the control signal being generated at a predetermined crank angle of the engine before a top dead center of each of the cylinders at which an intake stroke commences in the each of the cylinders; and (3) supplying fuel through injection to another one of the cylinders that corresponds to a pulse of the control signal next to a present pulse thereof upon generation of the present pulse, when the engine is determined to be in a second predetermined operating condition.

Preferably, when the engine is determined to have shifted from the first predetermined operating condition to the second predetermined operating condition, fuel is simultaneously supplied through injection to both one of the cylinders that corresponds to a present pulse of the control signal which is generated immediately after the shift and another one of the cylinders that corresponds to a next pulse of the control signal next to the present pulse, upon generation of the present pulse.

Also preferably, when the engine is determined to have shifted from the second predetermined operating condition to the first predetermined operating condition, supply of fuel to one of the cylinders that corresponds to a present pulse of the control signal which is generated immediately after the shift is suspended upon generation of the present pulse.

More preferably, the first predetermined operating condition of the engine is an operating condition wherein a temperature of the engine is lower than a predetermined value.

Preferably, the first predetermined operating condition of the engine is an operating condition wherein the rotational speed of the engine is lower than a predetermined value.

Also preferably, the second predetermined operating condition of the engine is an operating condition wherein a temperature of the engine is higher than a predetermined value and also the rotational speed of the engine is higher than a predetermined value.

The above and other objects, features and advantages of the invention will become more apparent from the ensuing detailed description taken in conjunction with the accompanying drawings.

BRIEF DESCRIPTION OF THE DRAWINGS

FIG. 4 is a flowchart of a subroutine for determining an injection mode according to the method of the invention.

DETAILED DESCRIPTION

The method according to the invention will now be described in detail with reference to the drawings showing an embodiment thereof.

Figure 1:
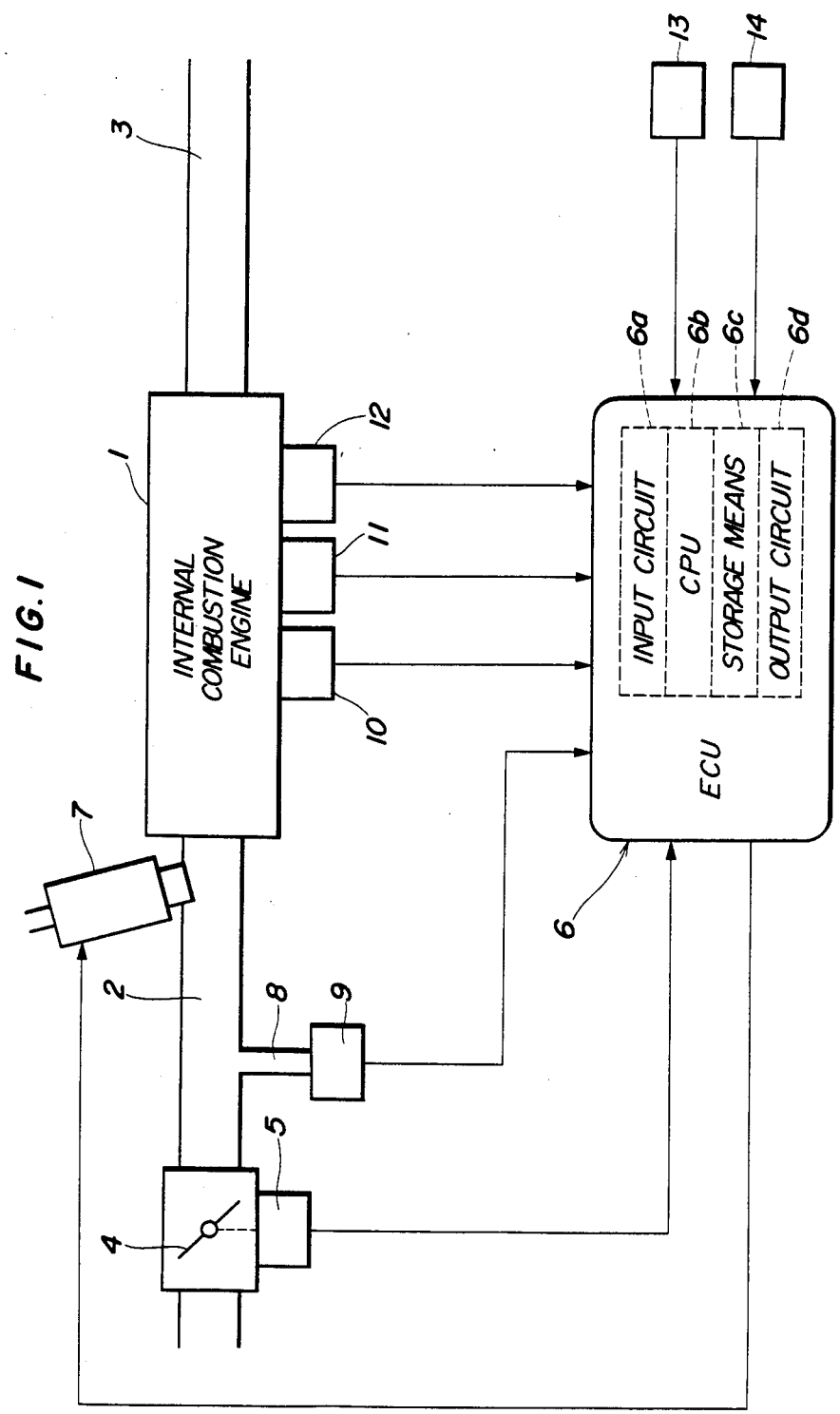
FIG. 1 is a block diagram illustrating the whole arrangement of a fuel injection control system to which is applied the method according to the invention.

Referring first to FIG. 1, there is illustrated the whole arrangement of a fuel injection control system, to which the method according to the invention is applied. Reference numeral 1 designates an internal combustion engine which may be a four-cylinder type, for instance. An intake pipe 2 and an exhaust pipe are connected at their respective one ends to the engine 1. In the intake pipe 2 is arranged a throttle valve 4, to which is connected a throttle valve opening ($\theta$TH) sensor 5 for detecting its valve opening ($\theta$TH) and converting same into an electrical signal which is supplied to an electronic control unit (hereinafter called "the ECU") 6.

Provided for each cylinder is a fuel injection valve 7, which is inserted into the intake pipe 2 at a location between the engine 1 and the throttle valve 4 and slightly upstream of an intake valve, not shown. Each injection valve 7 is connected to a fuel pump, not shown, and also electrically connected to the ECU 6 in a manner having its fuel injection timing and valve opening period controlled by signals supplied from the ECU 6.

An absolute pressure (PBA) sensor 9 is provided such that it communicates through a conduit 8 with the interior of the intake pipe 2 at a location immediately downstream of the throttle valve 4. The absolute pressure (PBA) sensor 9 is adapted to detect absolute pressure in the intake pipe 2 and applies an electrical signal indicative of the detected absolute pressure to the ECU 6.

An engine coolant temperature (TW) sensor 10 is mounted in the cylinder block of the engine 1 and is adapted to detect engine coolant temperature (TW) as engine temperature and applies an electrical signal indicative of the detected engine coolant temperature to the ECU 6.

An engine rotational speed sensor (hereinafter called "the NE Sensor") 11 and a cylinder-discriminating sensor (hereinafter called "the CYL sensor") 12 are arranged in facing relation to a camshaft, not shown, of the engine 1 or a crankshaft of same, not shown. The Ne sensor 11, in the case of a four-cylinder engine, is adapted to generate one pulse at one of the predetermined crank angles of the engine each time the engine crankshaft rotates through 180 degrees, as a pulse of a top-dead-center position (TDC) signal, while the CYL sensor 12 is adapted to generate one pulse at a predetermined crank angle of a particular engine cylinder. Pulses generated by the sensors 11, 12 are supplied to the ECU 6.

Further connected to the ECU 6 are a starting switch 13 of an engine starter, not shown, and other parameter sensors 14 such as an atmospheric pressure sensor for supplying the ECU 6, respectively, with an on-off signal indicative of the on-off status of the engine starter and electrical signals indicative of detected values of the other parameter sensors 14.

The ECU 6 comprises an input circuit 6a having functions, among others, of shaping the waveforms of signals inputted from some sensors, shifting the voltage levels of other input signals from other sensors to a predetermined level, and converting analog signal values into digital signal values, a central processing unit (hereinafter called "the CPU") 6b, a storage means 6c for storing various calculation programs to be executed in the CPU 6, the results of calculations, etc., and an output circuit 6d with such functions as supplying the fuel injection valves 7 with driving signals.

Upon generation of each TDC signal pulse, the ECU 6 reads in values of various engine operating parameter signals stated above, and then calculates the valve opening period TOUT for the fuel injection valves 7 based on those values in synchronism with generation of pulses of the TDC signal, by the use of the following equation (1):

$$TOUT = Ti \times K1 + K2 \tag{1}$$

where Ti represents a basic value of the valve opening period for the fuel injection valves 7, which is determined as a function of the engine rotational speed Ne and the intake pipe absolute pressure PBA, which is read in at a predetermined timing, e.g. at the timing of the TDC signal generation, and K1 and K2 are correction coefficients and correction variables, respectively, which have their values calculated by the use of respective predetermined equations on the basis of the values of engine operating parameter signals from various sensors such as the throttle valve opening sensor 5, the engine coolant temperature sensor 10, and other parameter sensors 14, which are read in at the predetermined timing, so as to optimize the operating characteristics of the engine such as startability, fuel consumption, and accelerability.

As stated above, signals indicative of various engine operating parameters, particularly intake pipe absolute pressure are read in at predetermined crank angles of the engine, i.e. at the time of generation of each TDC signal pulse. As a result, so far as the intake pipe absolute pressure is concerned, the detected absolute pressure value always shows an accurate value irrespective of pulsations in the absolute pressure within the intake pipe caused by opening and closing of the intake valve whereby accurate control of the engine operation is possible.

Further, the ECU 6 determines the fuel injection timing for the fuel injection valves 7 based on engine operating conditions, by means of an injection mode determining subroutine, described later, and then the ECU 6 supplies the fuel injection valves 7 with driving signals to open same at the determined fuel injection timing and for the valve opening period TOUT determined as above.

Next, the fuel injection timing control method according to the invention will be described.

After receiving the first CYL signal pulse after the engine start, the ECU 6 determines which one of the top dead centers of the four cylinders (cylinders #1 through #4) each TDC signal pulse generated thereafter corresponds to, and causes the fuel injection (sequential injection) to be effected in synchromism with each TDC signal pulse.

This fuel injection in synchronism with TDC signal is effected either in an S-2 fuel injection mode (hereinafter referred to as "the S-2 injection") or in an S-3 fuel injection mode (hereinafter referred to as "the S-3 injection") depending on the engine operating condition at the time of generation of the TDC signal, more particularly, depending on whether the current engine operating condition is such that the atomization degree of fuel is low. The S-2 injection is such that fuel is injected into the cylinder corresponding to the present pulse of the TDC signal at the time of generation of the present TDC signal pulse, and the S-3 injection is such that fuel is injected into the cylinder corresponding to the next TDC signal pulse at the time of generation of the present TDC signal pulse.

The fuel injection timing optimal for engine driveability and HC emission depends on engine operating conditions such as engine rotational speed. More particularly, for example, when the engine coolant temperature Tw is lower than a predetermined value Tswn (e.g. 20° C.), or when the engine rotational speed Ne is lower than a predetermined value Nsn (e.g. 1200 rpm), the atomization degree is low. To overcome the low atomization degree it is desirable that fuel injection timing should be determined such that the injected fuel from the respective injection valve 7 reaches the intake valve of respective cylinder immediately after the intake valve is opened (namely at a crank angle of several degrees before TDC), when the intake air quantity becomes the maximum. (For example, fuel injection may be effected at a crank angle of 90° before TDC.) On the other hand, when the engine rotational speed Ne becomes higher than the predetermined value Nsn, the fuel injection period TOUT becomes longer and the intake air quantity immediately after opening of the intake valve becomes extremely large, whereby the phenomenon can occur that the injected fuel that reaches the intake valve immediately after opening of the intake valve is directly expelled from the cylinder without remaining therein via the exhaust valve. Therefore, when the engine is operating in such a condition, it is desirable that the fuel injection timing should be determined such that the injected fuel from the respective injection valve reaches the intake valve of the respective cylinder before the intake valve is opened (for example, fuel injection may be effected at 270° before TDC).

For this reason, when the engine operating condition is such that the fuel atomization degree is low, e.g. when the engine temperature is low or when the engine rotational speed is low, it is expedient to adopt the S-2 injection whereby fuel injection is effected at the crank angle of 90° before TDC, and on the other hand when the engine operating condition is such that the fuel atomization degree is high, e.g. when the engine rotational speed is high, it is better to adopt the S-3 injection whereby fuel injection is effected at the crank angle of 270° before TDC, to thereby avoid HC emission.

Figure 2:
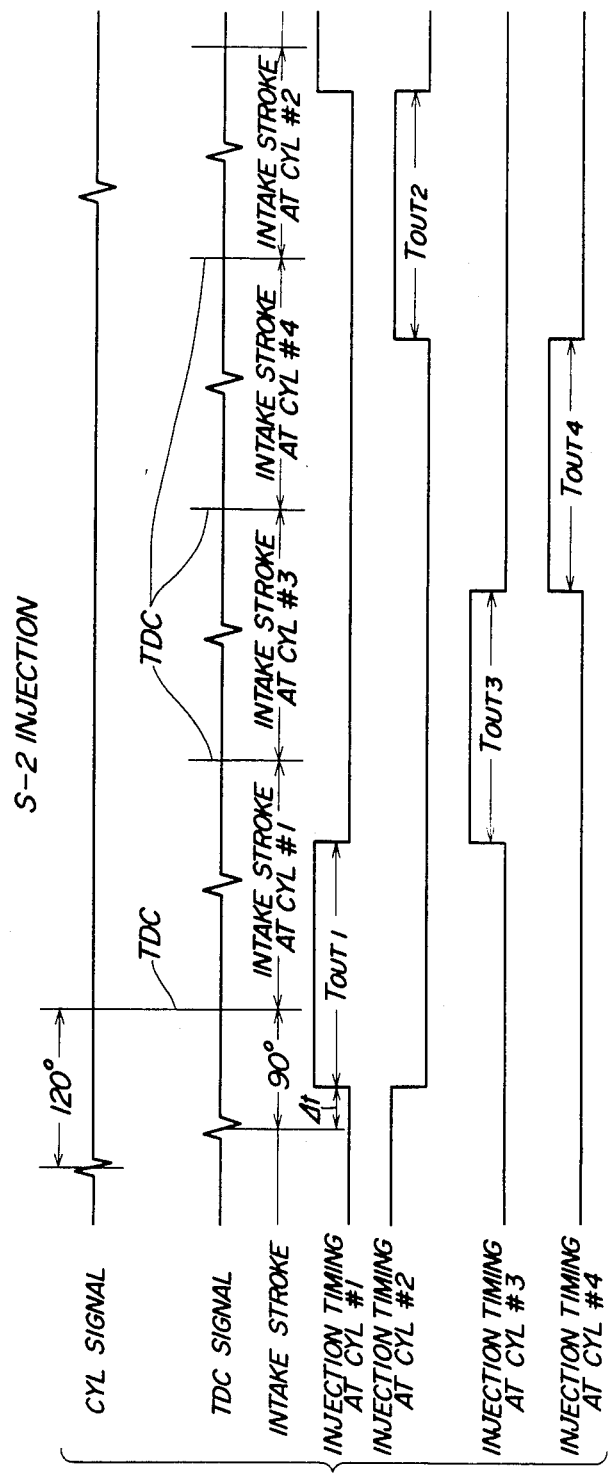
FIG. 2 is a timing chart showing injection timing for engine cylinders with respect to engine crank angle (TDC) signals, according to S-2 injection mode of the method of the invention.
Figure 3:
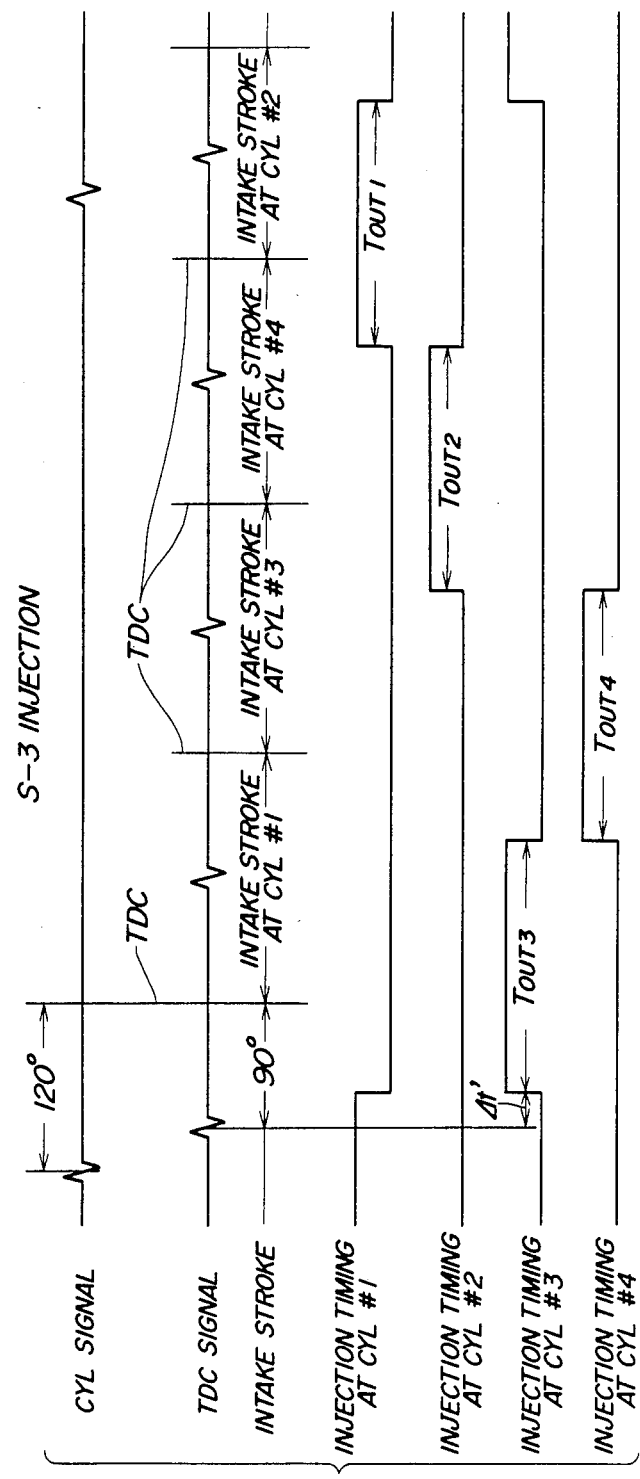
FIG. 3 is a timing chart similar to FIG. 2 according to S-3 injection mode of the method of the invention.

FIG. 2 is a timing chart showing the injection timing according to the S-2 injection with respect to the intake strokes of respective cylinders and to the TDC signal, and FIG. 3 is a timing chart similar to FIG. 2, according to the S-3 injection.

In the case where the S-2 injection is applied [FIG. 2], when, after generation of a CYL signal pulse, the first TDC signal pulse is generated (which corresponds to cylinder #1 in FIG. 2), the ECU 6 executes calculation of the valve opening period TOUT for the fuel injection valve corresponding to the cylinder #1 based on the detected values of various engine operating parameters [which calculation takes place during the period Δt in FIG. 2]. A fuel injection over the thus obtained valve opening period TOUT is effected into the cylinder #1 corresponding to the present TDC signal pulse, as indicated by TOUT1 in FIG. 2. Similarly, upon generation of the subsequent TDC signal pulses, i.e. as the 2nd, 3rd, and 4th TDC signal pulses are generated after the generation of the CYL signal pulse, the ECU 6 executes sequential fuel injections into the cylinders corresponding to the respective TDC signal pulses (i.e. cylinders #3, #4, #2 in this order) over the respective valve opening periods (i.e. TOUT3, 4, 2).

In the case where the S-3 injection is applied [FIG. 3], when, after generation of a CYL signal pulse, the first TDC signal pulse is generated (which corresponds to cylinder #1), the ECU 6 executes calculation of the valve opening period TOUT for the fuel injection valve corresponding to cylinder #3 in the same manner as in the case of the S-2 injection [which calculation takes place during the period Δt' in FIG. 3]. Then, a fuel injection is effected over the thus obtained valve opening period TOUT into the cylinder #3 corresponding to the next TDC signal pulse, as indicated by TOUT3 in FIG. 3. Upon generation of each subsequent TDC signal pulse, the ECU 6 similarly executes fuel injection into the cylinder which corresponds to the TDC signal pulse next to the each subsequent TDC signal pulse, over the valve opening period TOUT calculated upon generation of the each subsequent TDC signal pulse, so that sequential fuel injections are effected as indicated by TOUT3, 4, 2, 1 in FIG. 3.

Reference is now made to the manner of switching over between the S-2 injection and the S-3 injection in response to the engine operating condition.

FIG. 4 is a program flowchart of a subroutine for determining an injection mode to be applied, wherein the injection mode determination is made based on the engine rotational speed Ne. The program is executed in synchronism with each TDC signal pulse.

First, at a step 1 it is determined whether or not the engine coolant temperature Tw is higher than the predetermined value Twsn (e.g. 20° C.). If the result of this determination is No, that is, if the engine temperature is low, the program proceeds to a step 2 to execute the S-2 injection. By virtue of the step 1 it is possible to compensate for the decrease in the fuel atomization degree caused by low engine temperature.

When after engine start the engine coolant temperature Tw has exceeded the predetermined value Twsn (i.e. when the answer to the question at the step 1 becomes Yes), the program proceeds to a step 3 to determine whether or not the engine rotational speed Nen read in the present loop is higher than the predetermined value Nsn (e.g. 1200 rpm). If the engine rotational speed Nen has not yet risen high enough, the answer to this question becomes No, and then at a step 4 it is determined whether or not the engine rotational speed Nen-1 read in the immediately preceding loop is higher than the predetermined value Nsn, to thereby find out whether or not the S-3 injection was executed in the immediately preceding loop. Since at this time the engine speed is still being accelerated following engine start, the answer to the question of the step 4 becomes No, whereupon the program proceeds to the step 2 to execute the S-2 fuel injection. When the engine rotational speed Nen has risen above the predetermined value Nsn for the first time, the answer to the question at the step 3 turns to Yes, the program proceeds to a step 5 where it is determined, as in the step 4, whether or not the engine rotational speed Nen-1 read in the immediately preceding loop is higher than the predetermined value Nsn. Because at this time the engine rotational speed Nen has exceeded Nsn for the first time in the present loop, the answer at the step 5 is No, and then the program proceeds to a step 6 to execute the S-2 injection and the S-3 injection simultaneously. By thus simultaneously executing the S-2 injection and the S-3 injection in the present loop when the engine rotational speed Nen has exceeded Nsn for the first time, that is, when the injection mode is switched from the S-2 injection to the S-3 injection, it is possible to eliminate the inconvenience that if, for example, in the immediately preceding loop the S-2 injection was effected into the cylinder #1 corresponding to the first TDC signal pulse after generation of a CYL signal pulse, then execution of the S-3 injection alone in the present loop (which corresponds to the second TDC signal pulse generated after the CYL signal pulse, and therefore triggers injection into the cylinder #4) results in failure of supplying fuel to the cylinder #3.

Turning back to FIG. 4, so long as the engine rotational speed Nen is higher than the predetermined value Nsn in the subsequent loops, the result of the determination at step 3 remains Yes, and that at the step 5 becomes Yes, so that the program proceeds to a step 7 to execute the S-3 injection alone. On the other hand, when the engine rotational speed Nen decreases and becomes lower than Nsn for the first time (hence the result of determination at the step 3 is No), the program proceeds to the step 4 where on this occassion Yes is the answer, whereupon a step 8 is executed to suspend any fuel injection during the present loop, that is, neither the S-2 injection nor the S-3 injection is to be triggered by the present TDC signal pulse.

The reason for thus suspending not only the S-3 injection but also the S-2 injection in the present loop when the engine rotational speed Nen has become lower than Nsn for the first time, that is, when the injection mode is switched from the S-3 injection to the S-2 injection, is that if, for example, in the immediately preceding loop the S-3 injection was effected into the cylinder #3 corresponding to the first TDC signal pulse after generation of a CYL signal pulse, then there is no need for execution of the S-2 injection in the present loop (which corresponds to the second TDC signal pulse generated after the CYL signal pulse, and therefore triggers injection into the cylinder #3).

By selectively executing the S-2 injection and the S-3 injection in the manner described above, it is possible to control the fuel injection timing simply and smoothly in response to changes in the engine operating condition.

Incidentally, although in the embodiment described above the switchover between the S-2 injection and the S-3 injection is controlled in response to the engine coolant temperature and the engine rotational speed, it is to be understood that the invention is not limited to this but it is possible to control the switchover in response to other engine operation parameters such as intake pipe absolute pressure.

What is claimed is:

1. A method of controlling the timing of fuel injection in an internal combustion engine having a plurality of cylinders and as many fuel injection valves provided respectively for said cylinders, wherein the injection timing of each of said fuel injection valves is determined in response to operating conditions of said engine, the method comprising the steps of: (1) determining operating conditions of said engine; (2) supplying fuel through injection to one of said cylinders that corresponds to a present pulse of a control signal upon generation of the present pulse, when said engine is determined to be in a first predetermined operating condition, said control signal being generated at a predetermined crank angle of said engine before a top dead center of each of said cylinders at which an intake stroke commences in said each of said cylinders; and (3) supplying fuel through injection to another one of said cylinders that corresponds to a pulse of said control signal next to a present pulse thereof upon generation of the present pulse, when said engine is determined to be in a second predetermined operating condition.

2. A method as claimed in claim 1, wherein, when said engine is determined to have shifted from said first predetermined operating condition to said second predetermined operating condition, fuel is simultaneously supplied through injection to both one of said cylinders that corresponds to a present pulse of said control signal which is generated immediately after the shift and another one of said cylinders that corresponds to a next pulse of said control signal next to the present pulse, upon generation of the present pulse.

3. A method as claimed in claim 1, wherein, when said engine is determined to have shifted from said second predetermined operating condition to said first predetermined operating condition, supply of fuel to one of said cylinders that corresponds to a present pulse of said control signal which is generated immediately after the shift is suspended upon generation of the present pulse.

4. A method as claimed in any of claims 1–3, wherein said first predetermined operating condition of said engine is an operating condition wherein a temperature of said engine is lower than a predetermined value.

5. A method as claimed in any of claims 1–3, wherein said first predetermined operating condition of said engine is an operating condition wherein the rotational speed of said engine is lower than a predetermined value.

6. A method as claimed in any of claims 1–3, wherein said second predetermined operating condition of said engine is an operating condition wherein a temperature of said engine is higher than a predetermined value and also the rotational speed of said engine is higher than a predetermined value.

* * * * *